UNITED STATES PATENT OFFICE 2,661,634

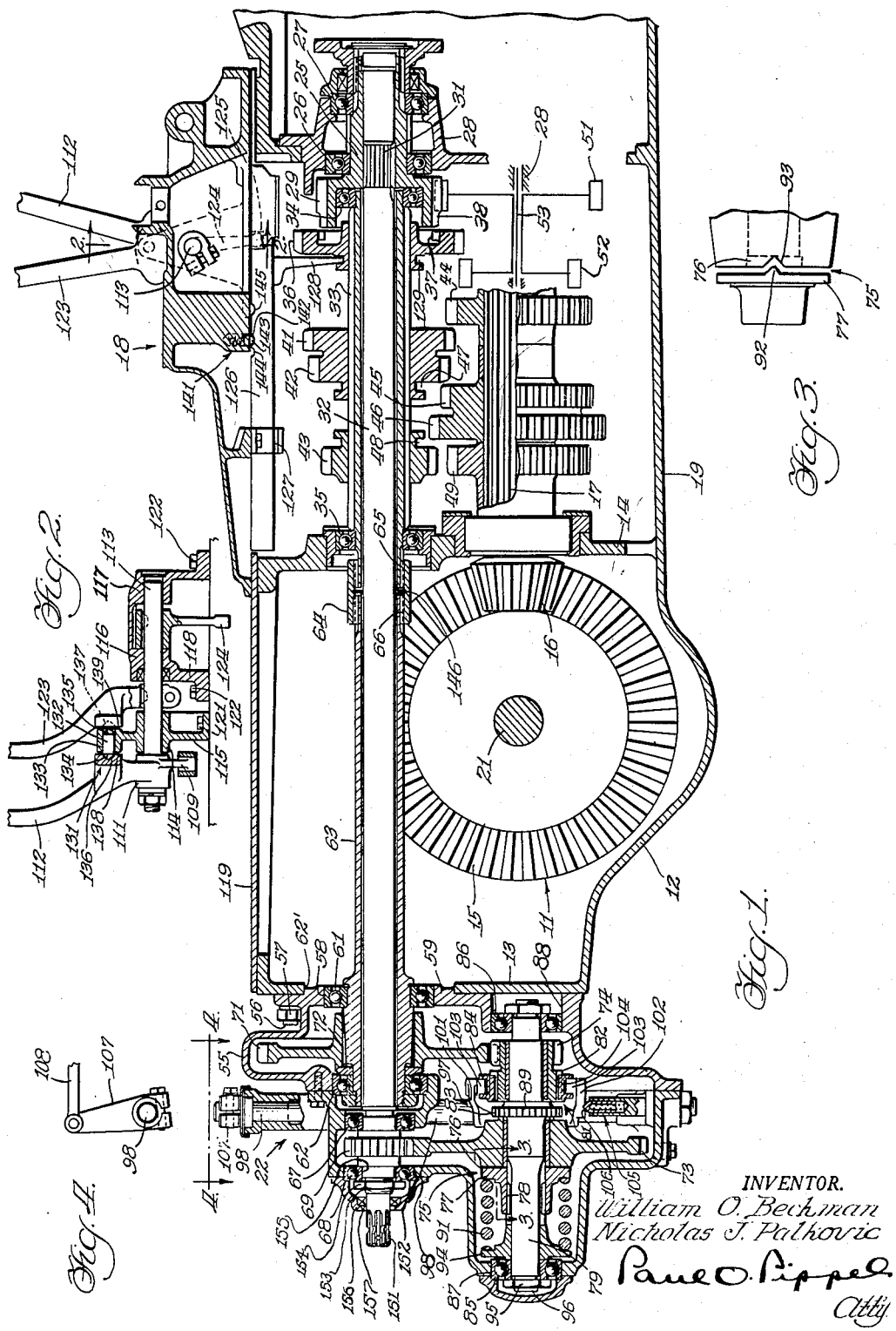

CHANGE SPEED TRANSMISSION FOR VEHICLES

William O. Bechman and Nicholas J. Palkovic, Chicago, Ill., assignors to International Harvester Company, a corporation of New Jersey Application June 10, 1948, Serial No. 32,118

7 Claims. (Cl. 74—700)

This invention has to do with a change-speed power transmission apparatus for transmitting power to final drive mechanism of vehicles, and more particularly concerns a type of power transmission apparatus wherein there are a plurality of power transmitting units interchangeably connectable in driving relation with the final drive mechanism.

Power transmission apparatus constructed according to the present invention is particularly adapted for use upon vehicles such as crawler tractors which are propelled and steered by driving propelling units at opposite sides of the vehicle at the same or different speeds. Vehicles of this kind comprise a final drive housing wherein there is a final drive mechanism including coaxial final drive shafts extending oppositely from a fore and aft center-line position of the vehicle toward opposite sides thereof for respective drive connection with the propelling units at the opposite sides of the vehicle. Such vehicles conventionally comprise a change-speed power transmission unit forwardly of the final drive casing and having a driven shaft drivingly connected with the two oppositely extending coaxial final drive shafts in such casing. The change speed transmission unit conventionally includes a main shaft whereon there are gears respectively mated with gears upon a countershaft for driving this countershaft at different speed reductions, and this countershaft constitutes the driven shaft having the driving connection with the final drive mechanism.

A general object of this invention is the provision of change-speed power transmission apparatus employing a change-speed gearing unit drivingly associated with the final drive mechanism of a vehicle in the above described manner and also employing an auxiliary power transmission unit having a selectively establishable driving connection with the countershaft of the change-speed power transmission unit.

A further object is the provision of power transmitting apparatus of the above character wherein the drive shaft of the change-speed transmission unit is tubular and has a disconnectable driving connection with a main drive shaft disposed concentrically therein and having a drive connection with the auxiliary power transmission unit, there being a disconnectable driving connection between the auxiliary power transmission unit and the tubular drive shaft of the change-speed transmission unit, whereby said tubular drive shaft and the countershaft can be selectively driven by power transmitted through the auxiliary transmission unit.

A further object is the provision of change-speed transmission apparatus according to the next preceding object wherein the auxiliary power transmission unit is attached to the rear wall of the final drive casing and is driven by an extension of the main drive shaft which extends across and through the final drive casing, and wherein a driven shaft of the auxiliary power transmission unit is in the form of a tubular shaft concentric with the extending portion of the main drive shaft and extends forwardly through the final drive casing into driving connection with the tubular drive shaft of the change-speed transmission unit.

A further object is the provision of change-speed transmission apparatus according to the two next preceding objects wherein the auxiliary power transmission unit includes a countershaft structure comprising gears respectively meshed with gears constrained for rotation with rearwardly projecting end portions of the main drive shaft and of the tubular driven shaft of such auxiliary unit, and the ratio of these gears is such as to provide a very slow "creeping" speed for the vehicle.

A further object is the provision of an auxiliary power transmission unit employing a slip clutch for limiting the amount of torque transmittable through such unit.

Still a further object is the provision of a change-speed power transmission unit and an auxiliary power transmission unit of the aforesaid character, together with an interlocked control therefor making it possible to alternatively connect these units in driving relation with the final drive mechanism but impossible to effect concurrent driving connections of these two units between the main drive shaft and the countershaft of the change-speed transmission unit.

The above and other desirable objects inherent in and encompassed by the invention will be readily comprehended from the ensuing description and claims together with the annexed drawings, wherein:

Fig. 1 is a vertical sectional view taken axially through power transmission apparatus constituting a preferred form of the invention and taken centrally and transversely through final drive mechanism of a steering-by-driving vehicle.

Fig. 2 is a fragmentary transverse sectional view taken on the line 2—2 of Fig. 1 illustrating transmission controls and an interlock device therefor.

Fig. 3 is a fragmentary plan view showing details of a slip clutch employed in the auxiliary power transmission unit constituting the left-hand portion of Fig. 1 and taken on the line 3—3 of Fig. 1.

Fig. 4 is a fragmentary plan view taken on the line 4—4 of Fig. 1 and illustrating a portion of a shifter fork control for the auxiliary power transmission unit.

The power transmission apparatus herein shown is for driving final drive mechanism 11 contained within a final drive housing 12. A rear wall of this housing is designated 13 and a front wall thereof is designated 14. The final drive mechanism includes a conventional large bevel gear 15 driven by a pinion 16 formed upon the rear end of a splined countershaft 17 of a change-speed power transmission unit 18 which includes a gear box 19 projecting forwardly from the front wall 14 of the final drive casing. Bevel gear 15 is arranged coaxially with oppositely extending final drive shafts 21 of which one is shown in Fig. 1. These final drive shafts 21 are drivingly connected with propelling and steering units, such as endless treads of crawler tractors, by conventional power transmitting connections which are thought unnecessary to show in conjunction with the disclosure of the present invention.

Normally the final drive mechanism will be driven by power transmitted solely through the change-speed transmission unit 18, but when it is desired to drive this mechanism, and hence the vehicle at an ultra-slow speed, an auxiliary power transmission unit 22, which is mounted on the rear wall of the final drive casing 12, will be used in combination with certain parts of the change-speed transmission unit 18.

Referring now to the change-speed transmission unit 18, it includes a main drive shaft 25 journaled within bearing units 26 and 27 in the front wall 28 of the gear box. This main drive shaft has a gear 29 formed integrally with its inner end and also comprises an internally splined recess 31 for meshing with splines upon the front end of a long shaft 32 which is disposed concentrically within an externally splined tubular shaft 33. Inasmuch as the long shaft 32 is constrained for rotation with the main drive shaft 25, said shafts 25 and 32 may be collectively regarded as a drive shaft structure 25—32. The externally splined tubular shaft 33 is rotatively carried at its forward end in a bearing unit 34 within a recessed end of the main drive shaft gear 29 and is rotatively carried at its rear end within a ball bearing unit 35 carried by the wall 14 which divides the final drive casing from the gear box and therefore constitutes the forward wall of the final drive casing and the rear wall of the gear box.

A gear 36 splined to the tubular drive shaft 33 carries internal clutch teeth comprising one counterpart 37 of a jaw clutch 37—38 of which the companion component 38 consists of clutch teeth integral with the teeth of the gear 29. When the gear 36 occupies its most forward position wherein the teeth 37 are meshed with the teeth 38, the main drive shaft 25 is directly connected with the tubular drive shaft 33. Under these circumstances the change-speed transmission unit will be connected in its high speed range and the countershaft 17 can be driven at different speeds when the drive shaft gears 41, 42, and 43 are respectively meshed with countershaft gears 44, 45, or 46. The gears 41 and 42 are part of a gear cluster splined to the shaft 33 and movable axially thereof by a shifter fork (not shown) cooperable with a shifter fork groove 47. The gear 43, which is splined to the shaft 33, is shiftable to and from meshed relation with the gear 46 by a shifter fork (not shown) cooperable with a shifter fork groove 48. Gear 43 is shown in a neutral position axially of the shaft 33 and may be slid rearwardly, that is, to the left as viewed in Fig. 1, into mesh with one gear of a reversing gear cluster (not shown) of which a second gear of the cluster meshes with countershaft gear 49 to cause reverse drive of the countershaft 17. This reversing drive for the countershaft is conventional, wherefore it is not illustrated in the drawings.

An alternative driving connection between the main drive shaft 25 and the tubular drive shaft 33, employable instead of the clutch 37—38, comprises a pair of diagrammatically illustrated gears 51 and 52 which are respectively meshed with the gear 29 and the slidable gear 36 when the latter is in its rearmost position illustrated in Fig. 1. The gears 51 and 52 are elements of a gear cluster 51—52 journaled upon a rod 53 supported at its ends in suitable parts of the gear box. When the gear 36 occupies a neutral position between the position illustrated in Fig. 1 and its foremost position wherein the clutch 37—38 is engaged, such gear will be demeshed from the gear 52 and clutch 37—38 will be disengaged, permitting the main drive shaft 25 to rotate without transmitting power to any of the gears mounted upon the tubular drive shaft 33.

Normally the countershaft 17, and hence the final drive shafts 21 of the final drive mechanism, will be driven through gear trains including the various meshable gears upon the tubular drive shaft 33 and the countershaft together with a driving connection through the clutch 37—38 or through the gears 29—51—52—36. However, when it is desired to drive the final drive shafts 21 at extremely slow speeds, the transmission unit 22 on the rear wall of the final drive casing will be employed in lieu of said clutch 37—38 or the low speed connection including the gear train 29—51—52—36. This auxiliary transmission unit constitutes an alternate speed reduction means for driving the tubular drive shaft 33 from the main drive shaft structure 25—32. When the tubular shaft 33 is driven at the extremely slow speeds possible through the auxiliary transmission unit, the countershaft 17 and the final drive shafts 21 will be driven at correspondingly extremely slow speeds which are selectable by selective meshing of the gear pairs 41—44, 42—45, and 43—46. It is also possible to drive the vehicle in reverse at an extremely slow speed using the auxiliary transmission unit when the reversing gear 43 is shifted rearwardly from the neutral position shown in Fig. 1 for connecting the reversing gear cluster (not shown) in series between this gear 43 and the countershaft reversing gear 49.

Auxiliary transmission unit 22 includes a separate casing 55 detachably secured to the final drive casing rear wall 13 by a plurality of stud bolts 56, of which one is shown in Fig. 1, and nuts 57 on these bolts. An opening 58 in the forward wall 59 of the auxiliary transmission unit casing contains a ball bearing unit 61 which registers with an opening 62' in the final drive casing rear wall 13. Casing bearing units 61 and 62 provide a journal support for a tubular driven shaft 63 which extends forwardly from the auxiliary transmission unit into driving relation with the tubular transmission shaft 33 by means of an internally splined coupling sleeve 64 of which the splines mesh with splines 65 and 66, respectively, upon the rear end of the tubular shaft 33 and upon the forward end of the tubular shaft 63. The long drive shaft 32 is arranged concentrically within the tubular driven shaft 63 and has a journal support on a rear end portion thereof within ball bearing units 67 and 68 mounted within the auxiliary transmission casing 55. A gear 69 is formed integrally with the rear end of the drive shaft 32, whereas a considerably larger diameter gear 71 is splined at 72 to a rear end portion of the tubular driven shaft 63. Gear 69 is meshed with a gear 73 of a countershaft structure whereas the gear 71 is meshed with a gear 74 of the countershaft structure. A slip clutch 75, comprising elements 76 and 77 respectively upon a hub of the gear 73 and splined at 78 to a shaft element 79 of the countershaft structure, constitutes a means for limiting the amount of torque transmittable from the gear 73 to the shaft element. A jaw clutch 81 constitutes means for establishing or disestablishing a driving connection between the shaft element 79 and the countershaft gear 74. Jaw clutch 81 comprises an externally splined hub extension 82 of the gear 74, clutch teeth 83 on the shaft element 79, and an internally splined collar 84 axially slidable from the disconnecting position illustrated in Fig. 1 to a clutch engaging position wherein the internal splines of the collar jointly mesh with the teeth on the externally splined extension 82 and the jaw clutch teeth 83.

Opposite ends of the countershaft element 79 are rotatively supported upon the inner races of ball bearing units 85 and 86. The outer races of these ball bearing units are disposed in coaxial opposite end wall openings 87 and 88 of the casing 55. A radially projecting force reaction element 89 formed on an intermediate portion of the shaft element 89 prevents endwise movement of the gear 73 by force exerted by a helical expansion spring 91 for the slip clutch 75. One end of the spring 91 presses against the slip clutch element 77 for impositively pressing diametrically opposite cuniform endwise projecting teeth 92 thereon into respective notches 93 in the element 76. One pair of these teeth 92 and notches 93 is shown in detail in Fig. 3. The left end of the expansion spring 91 reacts against a spring cap 94 of which the hub presses against the inner race of the ball bearing unit 85 which in turn reacts against a detachable force reaction element in the form of a nut 95 turned upon a threaded end portion 96 of the countershaft element 79. Thus the detachable force reaction element 95 reacts against the thrust of the spring 91 without any component of the thrust force being exerted through the balls of the ball bearing unit 85.

Engagement of the disconnectable clutch 81 is controlled by a shifter fork 97 of which the shank is attached to and constrained for rotation with a vertical shaft 98. Furcations 101 and 102 of the shifter fork 97 straddle the collar 84 and support shifter rollers 103 which project into a circumferential groove 104 of such collar. A detent device 105 cooperates with spaced notches 106 in the lower furcation 102, one of such notches being shown to be impositively retaining the shifter fork 97 in the position for releasing the clutch 81 or in the clutch disengaging position. An upper end portion of the clutch control shaft 98 has an arm 107 connected therewith for imparting rotational movement thereto.

A link 108 pivotally connects between the free end of the arm 107 and an arm 109 projecting radially from the hub 111 of a control lever 112 for the clutch 81 of the auxiliary transmission unit. Lever hub 111 is pivotally supported upon a shaft 113 which in turn is rotatively supported in a bearing 114 of a bracket 115 and in bearings 116 and 117 of a bracket 118. Bracket 115 is secured to the upper plate 119 of the gear box by bolts 121, whereas the bracket 118 is secured to said cover plate by bolts 122.

A control lever 123 for controlling the position of the shiftable transmission gear 36 is mounted on and constrained for rotation with the shaft 113 as is a shifter arm 124 of which the lower end is disposed within a notch 125 of a shifter rail 126. Said shifter rail is supported for endwise movement by bearings 127 of which one is shown in Fig. 1. A shifter fork 128 depending from the rail 126 cooperates with a groove 129 in the hub of the gear 36 for shifting said gear.

An interlock device 131 is disposed between the two control levers 112 and 123 for preventing engagement of the clutch 81 in the auxiliary transmission unit excepting when the change-speed transmission gear 36 and clutch element 37 associated therewith are in the neutral position, that is, when the gear 36 is demeshed from the gear 52 and the clutch element 37 is demeshed from the clutch element 38. This device comprises a cylindrical member 132 slidable axially within a bore 133 in the bracket 115, said cylindrical member having conical end portions 134 and 135 respectively receivable by conical recesses 136 and 137 respectively within curved faces 138 and 139 carried by the levers 112 and 123, said faces being curved circumferentially of the shaft 113. Each of the conical recesses 136 and 137 is disposed circumferentially of the shaft 113 in such a position as to register with the slidable locking member 132 when the transmission connection controlled thereby is in the neutral or disconnected condition. Thus in Fig. 2 it can be observed that while the control lever 112 is in the position causing the auxiliary transmission clutch 81 to be disengaged the recess 136 registers with the locking member 132 and thereby permitting such locking member to be slid to the left for accommodating movement of the lever 123 for establishing either the high speed condition with the clutch 37—38 engaged or the low speed condition with the gear 36 meshed with the gear 52. While the lever 123 is in either of the positions meshing the gear 36 or engaging the clutch 37—38, the recess 137 will be out of registry with the locking member 132 and a portion of the flat face 139 will be in registry with such locking member, retaining it in a locked position in the recess 136, preventing engagement of the auxiliary transmission clutch 81.

When the lever 123 is in neutral causing the gear 36 to be disengaged and the clutch 37—38 to be disengaged, the recess 137 will register with the locking member 132, making it possible for the lever 112 to be rocked for engaging the auxiliary transmission clutch 81, and pursuant to such rocking of the lever 112, the recess 136 will be moved from registry with the locking member incident to camming the locking member into the recess 137, and a portion of the flat face 138 will be placed in registration with such locking member for retaining it in the recess 137 and preventing movement of the gear-clutch element 36—37 from its neutral position. A positive retention of the gear-clutch element 36—37 in its neutral position is obtained by a detent device 141, while a notch 142 in the shifter rail 126 receives a spring-pressed ball 143 of such device. The ball 143 is received by a rail notch 144 when the clutch 37—38 is engaged, and a rail notch 145 registers with and receives the ball 143 when the gear 36 is meshed with the gear 52. Thus the detent device cooperates with the three notches 143, 144, and 145 for impositive retention of the gear-clutch element 36—37 in each of its three axially spaced positions.

It will be observed that the auxiliary transmission unit 22 may be optionally attached to the rear wall of the final drive casing 12 for supplementing the change-speed transmission unit 18. When the auxiliary unit 22 is disassembled from the remainder of the transmission apparatus, the nuts 57 will be loosened and such unit 22 disassociated from the change-speed transmission unit and the final drive casing by simply withdrawing such unit rearwardly incident to telescopically disconnecting the forward splined end of the long drive shaft 32 from the internally splined section of the main transmission drive shaft 25 and incident to telescopically disconnecting the forward splined end of the auxiliary-unit tubular driven shaft 63 from the internal splines of the coupling member 64. A snap ring 146 retains the splined coupling member 64 centrally associated in its coupling position between the tubular shafts 63 and 33. After the concentric shafts 32 and 63 of the auxiliary unit have been withdrawn through the rear wall opening 62 of the final drive casing, this opening will be closed by a cover plate (not shown). In the absence of the auxiliary transmission unit 22, the change-speed transmission unit 18 will operate conventionally between the main transmission drive shaft and the ring gear 15 of the final drive mechanism.

The inner end portion of the drive shaft 32 for the auxiliary transmission unit 22, that is, the portion of this shaft upon which the gear 69 is disposed, has a rearward power take-off extension 151 projecting outwardly through a rear wall opening 152 wherein the bearing unit 68 is disposed. A threaded section 153 of the drive shaft 32 for the auxiliary transmission unit 22 has a nut 154 turned thereon against the inner race of the bearing unit 68 to serve complementally with a shoulder 155 of said shaft for resisting endwise movement of the shaft. An apertured cap 156 attached to the rear wall of the auxiliary transmission casing contains an annular sealing unit 157 circumscribing the shaft.

Inasmuch as the auxiliary transmission drive shaft 32 is caused to rotate at all times with the main drive shaft 25, as a constituent of the drive shaft structure 25—32, the rearward power take-off extension 151 will be constantly driven irrespective of which of the power trains within the main transmission unit 18 or in the auxiliary transmission unit 22 are employed for transmitting driving force to the vehicle. Also, this power take-off extension 151 of the auxiliary transmission drive shaft will be caused to rotate when none of the aforesaid power trains is connected for the transmission of power, that is, when both the main transmission 18 and the auxiliary transmission 22 are in neutral. Therefore, this auxiliary power take-off extension 151 adapts the transmission apparatus for use upon a towing vehicle for drawing a machine therebehind requiring parts of its mechanism to be operated by power transmitted from the power take-off extension 151, and for these parts of the machine to be operated continuously irrespective of whether the towing vehicle is at rest.

Having thus described a single preferred embodiment of the invention with the view of clearly and concisely illustrating the same, we claim:

1. Change-speed power transmission apparatus for transmitting driving force to final drive mechanism of a vehicle, comprising power transmission units of different speed ratio on respective opposite sides of such mechanism, one of said units including a driven shaft drivingly connected with the final drive mechanism, a selectively driveable shaft extending across said mechanism for being alternatively driven through said units, means for driving the driven shaft from said selectively driveable shaft, a drive shaft structure also extending across said mechanism in driving relation with said units, and means for selectively conditioning the transmission units for driving the selectively driveable shaft.

2. Change-speed power transmission apparatus for transmitting driving force to final drive mechanism of a vehicle, comprising power transmission units of different speed ratio on respective opposite sides of such mechanism, one of said units including a driven shaft drivingly connected with the final drive mechanism, a tubular selectively driveable shaft structure extending across said mechanism and between said units, a drive shaft structure for driving said units and extending through the tubular shaft, means for driving said driven shaft from the tubular shaft, and means for selectively conditioning the transmission units for alternatively driving the tubular shaft structure therefrom.

3. In a power transmission unit employable with a vehicle drive mechanism enclosed in a housing having opposite walls with axially aligned openings, and a change-speed unit on the exterior side of one of such walls comprising a drive shaft coaxial with the housing wall openings, a tubular shaft coaxial with the drive shaft and rotatable relatively thereto, means for selectively establishing a driving connection between the drive shaft and said tubular shaft, and means for driving said mechanism from the tubular shaft; the combination of a transmission casing mountable exteriorly on the opposite wall of said housing, a pair of coaxial inner and outer shafts rotatively supported in the casing and projectable through the house openings into respective driving connection with said drive shaft and said tubular shaft, gears in the casing and respectively constrained for rotation with the inner and outer shafts, a countershaft in the casing, independently rotatable gears on the countershaft and respectively meshed with the first recited gears, and means for establishing or disestablishing a driving connection between the countershaft gears.

4. The combination set forth in claim 3, wherein there is an interlocked control manipulatable to selectively establish the driving connection of the drive shaft with the tubular shaft or the driving connection between the countershaft gears only while the other of such connections is disestablished.

5. Change-speed power transmission apparatus comprising a plurality of power transmission units; one of said units including a driven shaft, a selectively drivable shaft, and means for transmitting drive from the selectively drivable shaft to the driven shaft; a drive shaft structure; and controllable driving means having components respectively in said units for alternatively driving the drivable shaft from the drive shaft structure at different speeds with respect thereto.

6. The combination set forth in claim 5, wherein the controllable driving means components are adapted to drive the drivable shaft at different reduced speeds, and wherein the component in the other of said units is adapted to drive the drivable shaft at the lowest of such speeds.

7. The combination set forth in claim 6, wherein the means for transmitting drive from the selectively drivable shaft to the driven shaft is settable to drive the driven shaft at different speeds relatively to the selectively drivable shaft.

WILLIAM O. BECHMAN.
NICHOLAS J. PALKOVIC.

References Cited in the file of this patent

UNITED STATES PATENTS

| Number | Name | Date |
| --- | --- | --- |
| 919,564 | Everett | Apr. 27, 1909 |
| 1,410,655 | Clifford | Mar. 28, 1922 |
| 1,611,963 | Valentine | Dec. 28, 1926 |
| 1,843,875 | Kendall | Feb. 2, 1932 |
| 2,102,002 | Hill | Dec. 14, 1937 |
| 2,306,545 | Kummick | Dec. 29, 1942 |
| 2,311,265 | Stumpf | Feb. 16, 1943 |
| 2,334,958 | Rohkar | Nov. 23, 1943 |
| 2,355,869 | Johnston | Aug. 15, 1944 |
| 2,445,716 | Sternberg | July 20, 1948 |

FOREIGN PATENTS

| Number | Country | Date |
| --- | --- | --- |
| 17,573 | Great Britain | Aug. 21, 1908 |
| 364,758 | Germany | Dec. 1, 1922 |
| 522,260 | Great Britain | June 13, 1940 |
| 542,627 | France | Mar. 19, 1922 |
| 556,359 | Germany | Aug. 8, 1932 |